(12) United States Patent
Rohr (10) Patent No.: US 10,252,603 B2
(45) Date of Patent: Apr. 9, 2019

(54) TRUCK CAP WITH REAR LIFT GATE FOR A TRUCK

(71) Applicant: A.R.E. Accessories, LLC, Ann Arbor, MI (US)

(72) Inventor: Andrew N. Rohr, Copley, OH (US)

(73) Assignee: A.R.E. Accessories, LLC, Ann Arbor, MI (US)

( * ) Notice: Subject to any disclaimer, the term of this patent is extended or adjusted under 35 U.S.C. 154(b) by 4 days.

(21) Appl. No.: 15/471,276

(22) Filed: Mar. 28, 2017

(65) Prior Publication Data

US 2018/0118006 A1    May 3, 2018

Related U.S. Application Data

(60) Provisional application No. 62/416,465, filed on Nov. 2, 2016.

(51) Int. Cl.
| | |
|---|---|
| *B60J 7/16* | (2006.01) |
| *B60J 1/18* | (2006.01) |
| *B60J 5/10* | (2006.01) |

(52) U.S. Cl.
CPC ........... *B60J 7/1621* (2013.01); *B60J 1/1884* (2013.01); *B60J 5/108* (2013.01)

(58) Field of Classification Search
CPC ......... B60J 7/1621; B60J 5/108; B60J 1/1884
See application file for complete search history.

(56) References Cited

U.S. PATENT DOCUMENTS

| | | | | |
|---|---|---|---|---|
| 4,896,136 A | * | 1/1990 | Hotovy | ................. B60Q 1/302 |
| | | | | 340/468 |
| D403,652 S | * | 1/1999 | Starr; John R | .............. D12/404 |

* cited by examiner

*Primary Examiner* — D Glenn Dayoan
*Assistant Examiner* — Melissa A Black
(74) *Attorney, Agent, or Firm* — Harness, Dickey & Pierce, P.L.C.

(57) ABSTRACT

A rear lift gate can be hingedly coupled to a truck cap body and movable between a lowered closed position and a raised open position. The rear lift gate can include a lower margin having a convex shape generally corresponding to an outward or rearward convex upper margin of the tailgate. The rear lift gate can further include a seal strip mounted to an interior side of the lower margin of the rear lift gate. The convex lower margin of the rear lift gate can overlay the convex upper margin of the exterior side of the tailgate with the seal strip of the interior side of the lower margin of the rear lift gate sealing against the exterior side of the convex upper margin of the tailgate when the rear lift gate is in the lowered closed position.

26 Claims, 6 Drawing Sheets

TRUCK CAP WITH REAR LIFT GATE FOR A TRUCK

CROSS-REFERENCE TO RELATED APPLICATIONS

This application claims the benefit of U.S. Provisional Application No. 62/416,465, filed on Nov. 2, 2016. The entire disclosure of the above application is incorporated herein by reference.

FIELD

The present disclosure relates to truck caps for covering a cargo box or bed of a truck, such as a pickup truck.

BACKGROUND

This section provides background information related to the present disclosure which is not necessarily prior art.

It is known to provide a truck cap for a pickup truck that includes a rear gate or door that raises up and can be formed of a glass sheet or other sheet or panel material. It is also know to provide a contour strip, formed for example of polymeric material, that is attached along the bottom of the sheet material, which contour strip extends over the tailgate and downward to seal rear gate. It is also desirable to improve the visual aesthetics at the juncture between the rear lift gate and the tailgate and/or provide a more seamless visual integration of the truck cap with the truck.

SUMMARY

This section provides a general summary of the disclosure, and is not a comprehensive disclosure of its full scope or all of its features.

In accordance with one aspect of the present disclosure, a combination truck and truck cap can include a truck including a cargo box with a tailgate. The tailgate can have an exterior side including a convex upper margin. A truck cap can be mounted to the truck over the cargo box. The truck cap can include a rear lift gate hingedly coupled to a truck cap body and movable between a lowered closed position and a raised open position. The rear lift gate of the truck cap can include a lower margin having a convex shape generally corresponding to the convex upper margin of the tailgate. The rear lift gate can further include a seal strip mounted to an interior side of the lower margin of the rear lift gate. The convex lower margin of the rear lift gate can overlay the convex upper margin of the exterior side of the tailgate with the seal strip of the interior side of the lower margin of the rear lift gate sealing against the exterior side of the convex upper margin of the tailgate when the rear lift gate is in the lowered closed position.

In accordance with another aspect of the present disclosure, a truck cap for covering a cargo box of a truck can be provided. The truck can have a tailgate including an exterior side having a convex upper margin. The truck cap can include a truck cap body, a rear lift gate and a seal strip. The truck cap body can be mountable to the cargo box. The rear lift gate can be hingedly coupled to the truck cap body and movable between a lowered closed position and a raised open position. The rear lift gate of the truck cap can include a lower margin having a convex shape generally corresponding to the convex upper margin of the tailgate. The rear lift gate can be positionable outboard of and overlaying the convex upper margin of the tailgate when the rear lift gate is in the lowered closed position. The seal strip can be mounted to an interior side of the lower margin of the rear lift gate and sealable against the upper margin of the exterior side of the tailgate when the rear lift gate is in the lowered closed position.

In accordance with another aspect of the present disclosure, a truck cap for covering a cargo box of a truck can be provided. The truck cap can include a truck cap body mountable to the cargo box and a rear lift gate. A hinge can couple the rear lift gate to the truck cap body and can operate to move the rear lift gate between a lowered closed position and a raised open position. The hinge can include a hinge housing, a hinge arm, and a plurality of rollers. The hinge housing can be mounted to a first of the rear lift gate and the truck cap body. The hinge housing can include at least one arc shaped housing surface. The hinge arm can be movably supported by the hinge housing and mounted to a second of the rear lift gate and the truck cap body. The hinge arm can include at least one arc shaped arm surface. The plurality of rollers can be positioned between the arc shaped housing surface and the arc shaped arm surface to guide the hinge arm along a corresponding arc shaped path as the hinge moves the rear lift gate between the lowered closed position and the raised open position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The drawing figures illustrate one example of a truck cap 20 for covering a cargo box or bed 19 of a truck 17, and of a truck cap 20 and truck 17 combination in accordance with the present disclosure. As shown in the illustrated example, the truck 17 can be a pickup truck. The truck can include a cargo box 19 with a tailgate 15. The tailgate 15 can have a rearward or exterior side or surface 13 that includes an outwardly contoured or convex upper edge or margin 11.

Figure 1:
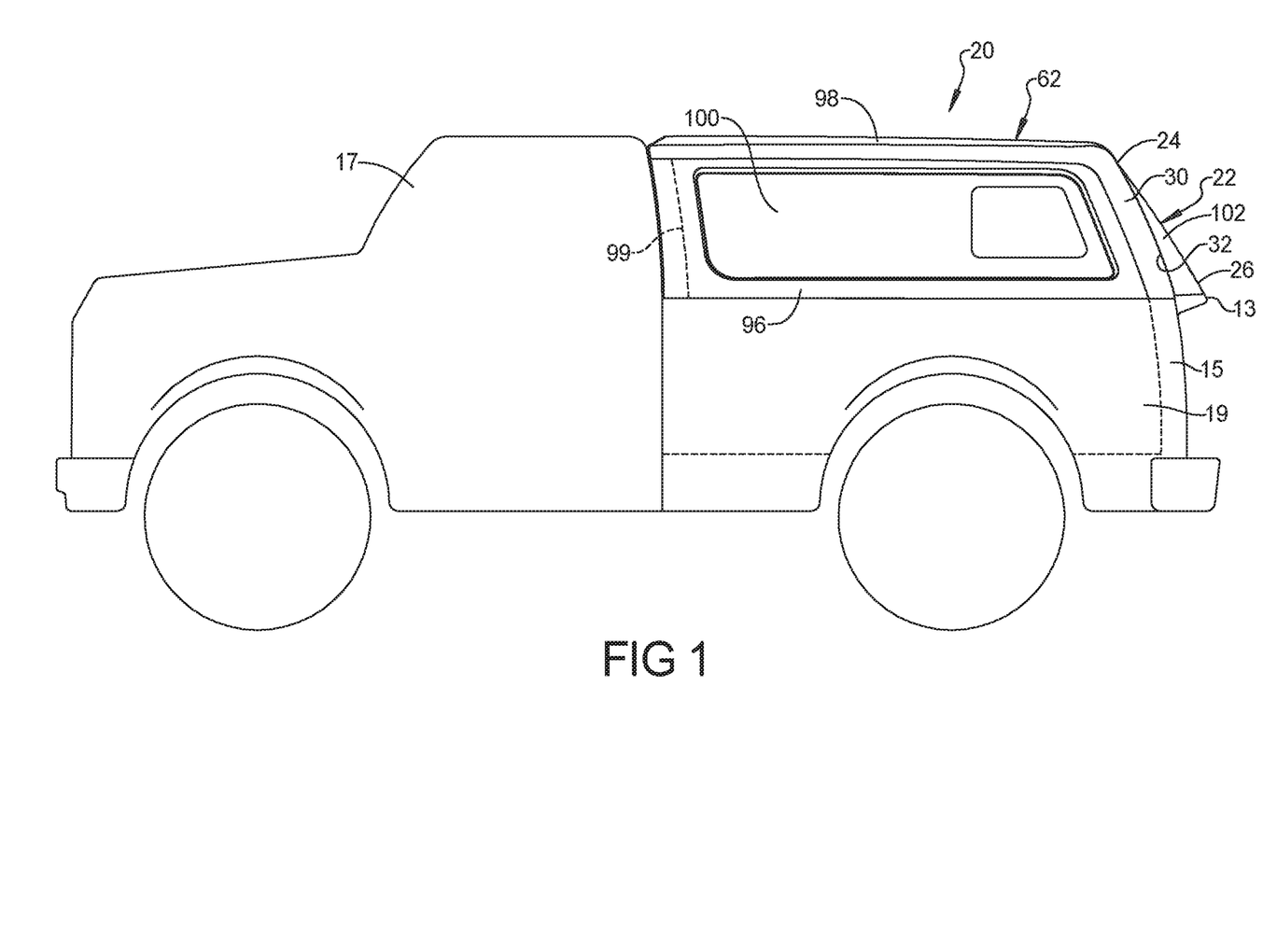
FIG. 1 is a side elevation view of one example truck cap and truck cap and truck combination in accordance with the present disclosure.
Figure 2:
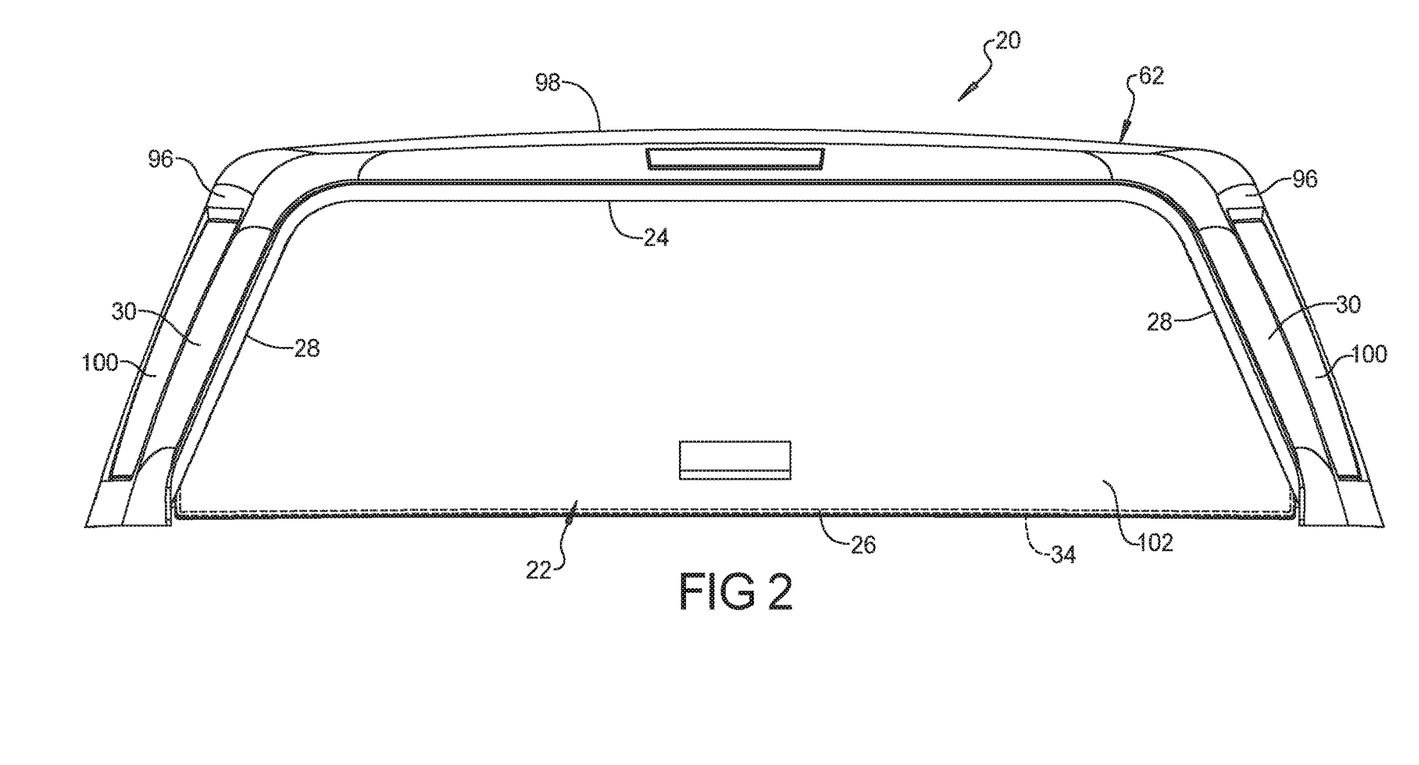
FIG. 2 is a rear elevation view of the example truck cap of FIG. 1, with the rear lift gate in a lowered closed position.

The truck cap 20 includes a truck cap body 62 and a rear lift gate or door 22 generally positioned above the tailgate 15. The truck cap body 62 can generally include a pair of opposite upright side walls 96 with an upright forward wall 99 extending between the side walls 96 and a roof 98 extending therebetween. Each side wall 96 can include a window 100 and rear side pillars 30.

Figure 3:
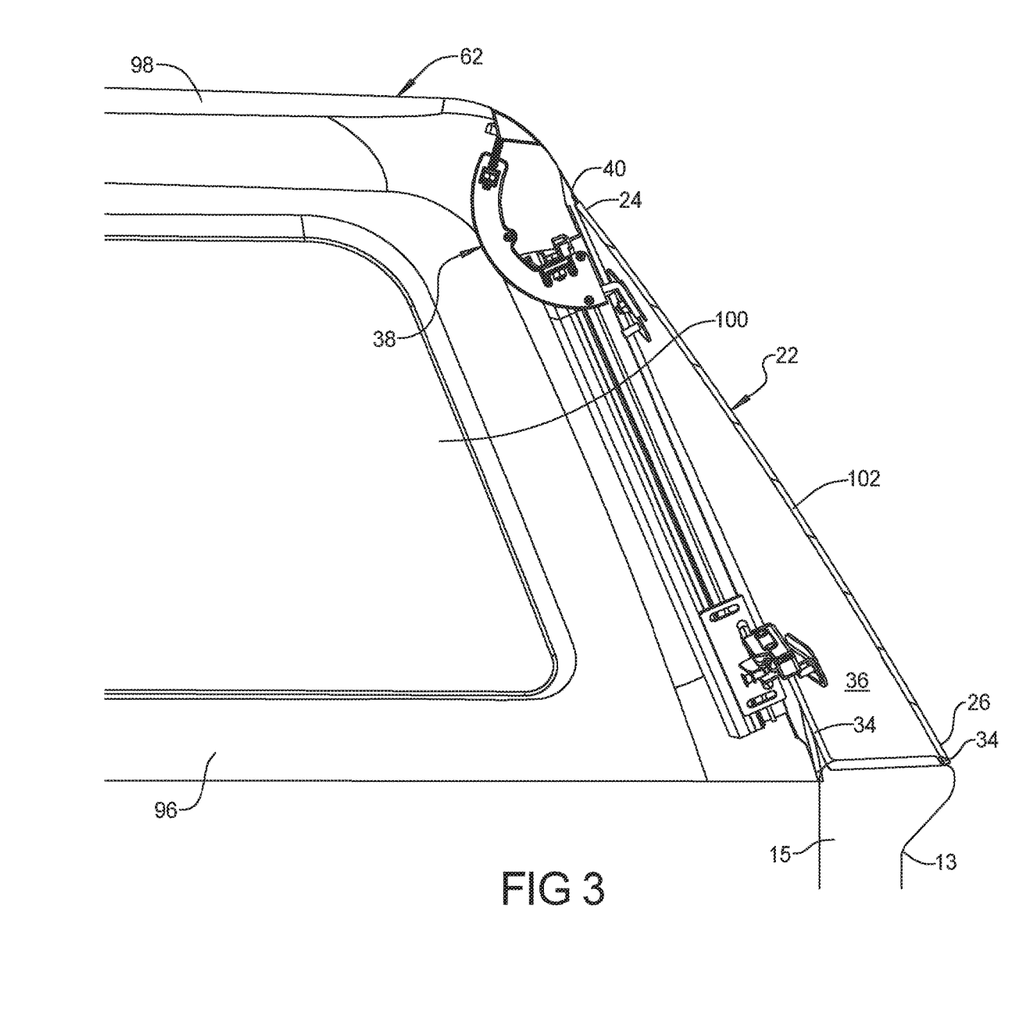
FIG. 3 is a partial cross-sectional view of the truck cap and truck of FIG. 1, with the rear lift gate in a lowered closed position.

The rear lift gate 22 can be formed of a transparent sheet material or panel 102, such as glass or a polymer. Alternatively, the sheet or panel 102 can be made of a non-transparent polymer, fiberglass or metal material. As such, statements herein regarding characteristics or features of the rear lift gate 22 are likewise applicable to the transparent sheet 102 even if not expressly stated. The rear lift gate 22 or transparent sheet 102 can have an upper edge 24 that is curved. Alternately, the upper edge can be relatively straight or linear. A lower edge or margin 26 of the rear lift gate 22 or transparent sheet 102 can be contoured to match or generally correspond to the convex rearward or exterior side 13 along a top edge or upper margin 11 of the tailgate 15 of the pickup truck 17. The upper edge 24 can be straight and the rear lift gate 22 or transparent sheet 102 can smoothly transition between the straight upper edge and the convex lower margin 26.

Thus, rear lift gate 22 or transparent sheet 102 can have an outwardly contoured or convex shape that becomes more pronounced from the upper edge 24 to the lower margin 26. In other words, the rear lift gate 22 or transparent sheet 102 can have an outwardly contoured shape in a horizontal direction intermediate the upper edge 24 and the lower margin 26. The outwardly contoured or convex shape in the horizontal direction can have its greatest curvature at the lower margin 26. In addition, the rear lift gate 22 or transparent sheet 102 can have an outwardly contoured or convex shape in a vertical direction intermediate the opposite side edges 28. In such a case, the outwardly contoured shapes of the rear lift gate 22 or transparent sheet 102 in both the vertical and the horizontal direction can cooperate to provide at least a central portion of the rear lift gate 22 or transparent sheet 102 with a complex shape.

When in a lowered closed position, the opposite side edges 28 of the contoured rear lift gate 22 seal against adjacent side pillars 30 at the rear of the truck cap 20. In a side elevation view, from the upper edge 24 to the lower edge 26, the contoured rear lift gate 22 can increasingly extend rearwardly beyond the rear surface 32 of the adjacent side pillars 30. Additionally or alternatively, the contoured rear lift gate 22 can similarly increasingly extend rearwardly beyond the opposite side edges 28 of the rear lift gate 22 from the upper edge 24 to the lower edge 26.

A sealing strip 34 can be mounted to the rear lift gate 22 or transparent sheet 102 along an interior surface or side 36 of the lower margin 26. The convex lower margin 26 of the rear lift gate 22 or transparent sheet 102 can be positioned to be rearwardly, or outboard of, and to overlay the convex upper margin 11 of the exterior side 13 of the tailgate 15 when the rear lift gate 22 is in the lowered closed position. Thus, the seal strip 34 of the interior side 36 of the lower margin 26 can engage and seal against the exterior side 13 of the convex upper margin 11 of the exterior rear surface 13 of the tailgate 15 when the rear lift gate 22 is in the lowered closed position.

Figure 5:
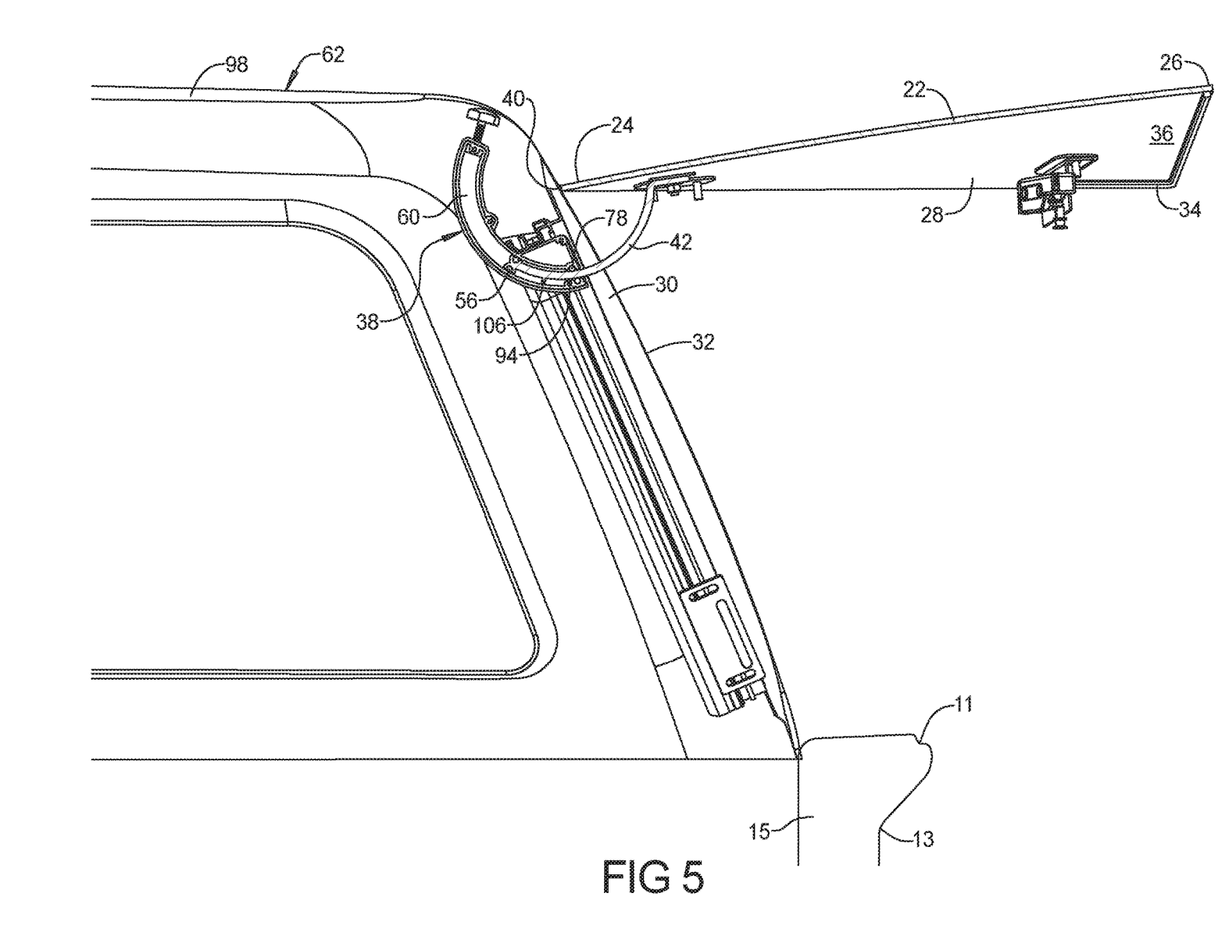
FIG. 5 is a partial cross-sectional view of the truck cap and truck of FIG. 1, with the rear lift gate in a raised open position.

A second or cap body seal strip 104 can be mounted to the truck cap body 62. The cap body seal strip 104 can seal against the interior side 36 of the rear lift gate 22 or transparent sheet 102 along its upper edge or margin 24 and along its opposite side edges 28 when the rear lift gate 22 is in the lowered closed position. The lift gate seal strip 34 can additionally extend partially or fully up the opposite side edges 28 of the rear lift gate 22 to seal against the side pillars 30 of the truck cap 20. The lift gate seal strip 34, including any such side extensions, can be positioned laterally interior to the cap body seal strip 104.

Figure 4:
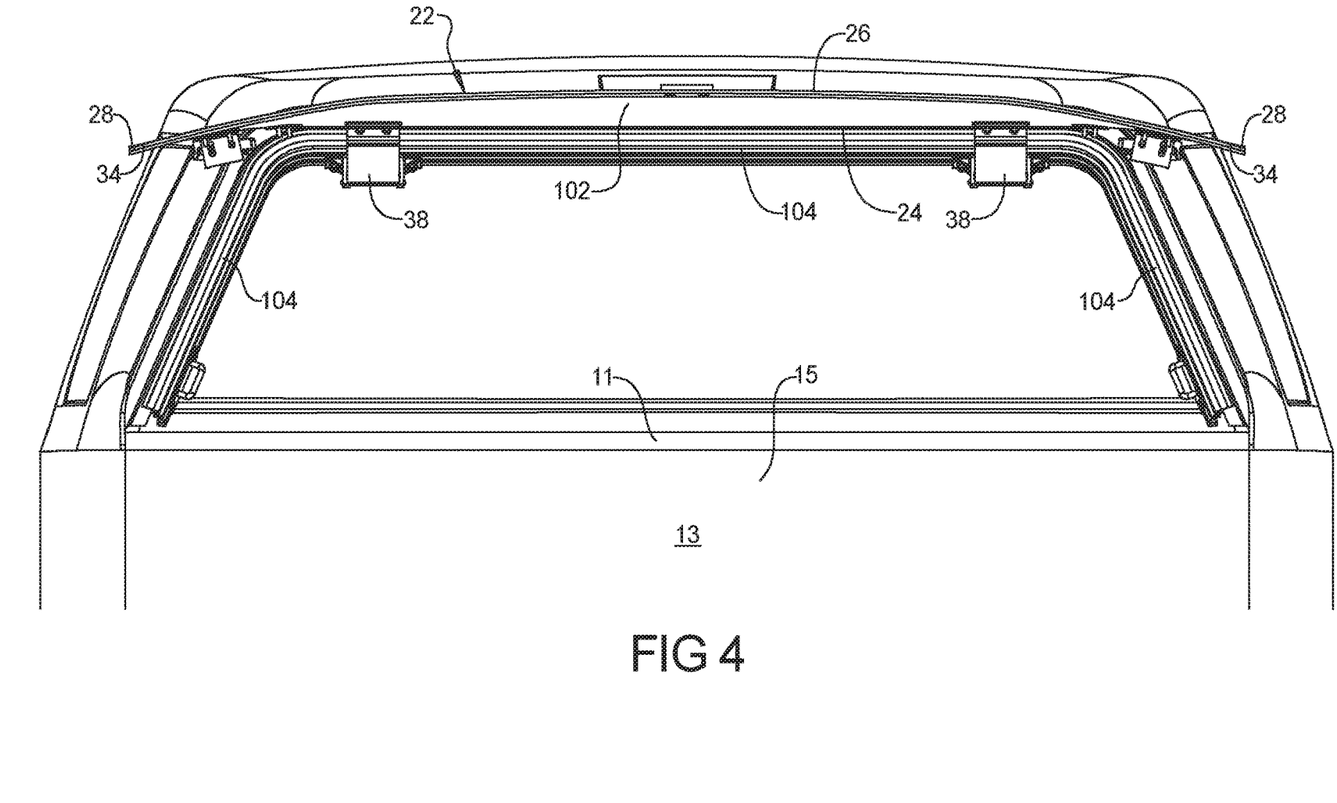
FIG. 4 is a partial rear elevation view of the example truck cap and truck of FIG. 1, with the rear lift gate in a raised open position.

A pair of hinges 38 can be provided to pivotably couple the rear lift gate 22 relative to the truck cap 20 between the lowered closed position and the raised open position. The hinges 38 can have a structure that pivots the rear lift gate 22 about its upper distal end 40 adjacent the upper edge 24. For example, the pivot point defined by the hinges 38 about which the hinges 38 pivot can be aligned with the upper outer corner of the upper distal end 40 extending along the upper edge 24 of the rear lift gate 22. In addition, the structure and relative positioning of the hinges 38 can pivot the rear lift gate 22 without moving or repositioning the upper edge 24 rearwardly, or upwardly, or both.

Figure 6:
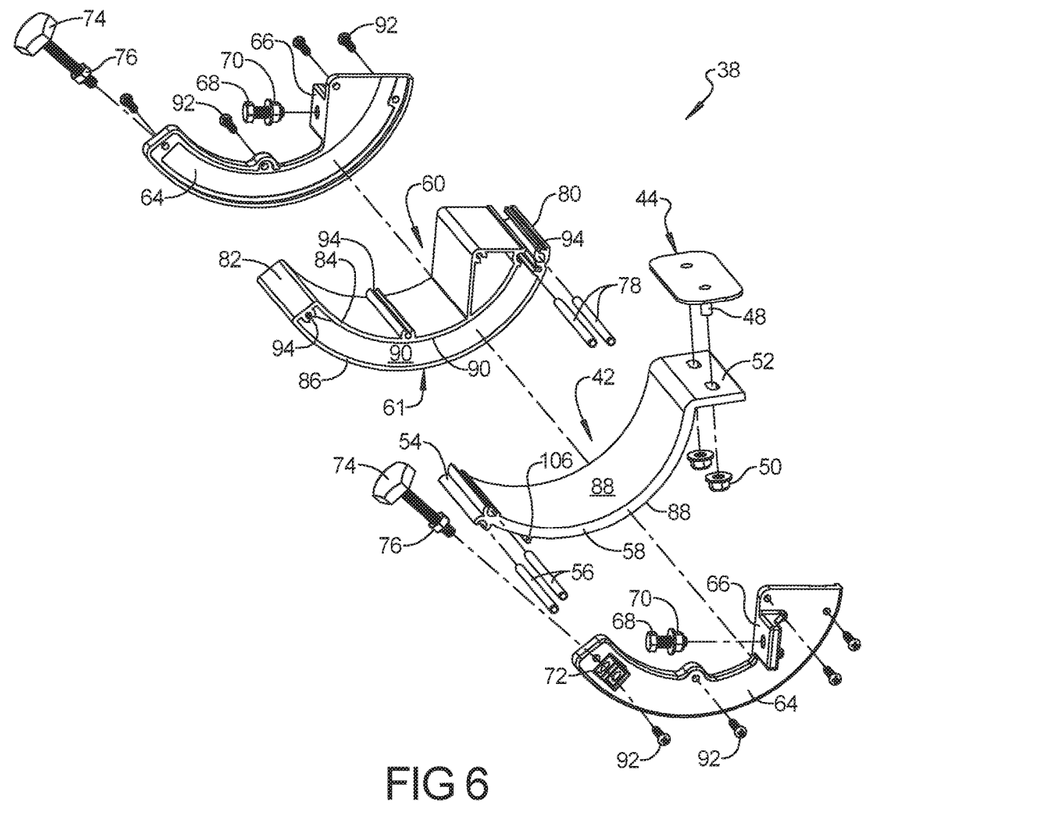
FIG. 6 is an exploded perspective view of one of the pair of hinges of the example truck cap of FIG. 1.

The hinges 38 can each include a first or lift gate arm 42 that can be mounted or fixedly coupled to the rear lift gate 22 at a first or proximal end 52 via an arm coupling assembly 44. The arm coupling assembly 44 can include a coupling plate 46 with threaded fasteners 48 and cooperating threaded fasteners 50. A pair of hinge arm rollers 56 can be coupled to the second, opposite, or distal end 54 of the hinge arm 42. The lift gate or hinge arm 42 defines an arc-shaped portion 58 of a circle between its proximal end 52 and its distal end 54.

The hinges 38 can each include a second or cap body arm or hinge housing 60. The cap body or hinge housing 60 can include end or side caps 64 coupled to a central housing body 61 by threaded fasteners 92 that can be threaded into corresponding openings 94. The hinge housing 60 can be mounted or fixedly coupled to the body 62 of the truck cap 20 via a coupling assembly. The housing coupling assembly can include end or side caps 64, each with a coupling flange 66 and threaded fasteners 68 and cooperating threaded fasteners 70. Additional coupling flanges 72 with manually adjustable threaded positioning members 74 and cooperating non-rotatably captured threaded fasteners 76. The manually adjustable positioning members 74 can extend adjacent the distal end 82 of the hinge housing 60 that is adjustable to engage against the truck cap body 62 to stabilize the hinge 38 when the manually adjustable positioning member 74 is properly adjusted.

The coupling flanges 66 can be provided adjacent a first, or proximal end 80 of the cap body housing 60. The additional coupling flanges 72 can be provided adjacent the second, opposite, or distal end 82 of the hinge housing 60 of the hinges 38. A pair of hinge housing rollers 78 can be coupled to the second, opposite, or distal end 82 of the hinge housing 60 of the hinges 38. The cap body housing 60 can define inner and outer arc-shaped portions or walls 84 and 86, respectively, that can extend between their proximal end 80 and distal end 82.

When assembled together, the radii defining each of the arc-shaped portions 58, 84, and 86 can share a common origin and this common origin can define the pivot point of the hinge 38. As discussed above, this common origin defining the pivot point of the hinges 38 can be aligned with the upper distal end 40 adjacent the upper edge 24. For example, the origin defining the pivot point can be aligned with the upper outer corner of the upper distal end 40 extending along the upper edge 24 of the rear lift gate 22. In instances where the upper distal end 40 of the upper edge 24 has a slight curvature, the pivot point can, for example. be aligned with the upper outer corner of a center of the upper distal end 40, which would be the highest point of the rear lift gate 22 in the closed position.

A plurality of rollers 78, 56 can be positioned between the arc shaped housing surfaces 90 and the arc shaped arm surfaces 88 to guide the hinge arm 42 along a corresponding arc shaped path as the hinge 38 moves the rear lift gate 22 between the lowered closed position and the raised open position. For example, as the rear lift gate 22 pivots between its closed and open positions, the rollers 78 of the hinge housing 60 can engage against opposite, outwardly-facing, sides or surfaces 88 of the arc-shaped wall 58 of the hinge arm 42. In addition, the rollers 56 of the hinge arm 42 can engage against opposing, inwardly-facing, sides or surfaces 90 of the arc-shaped walls 84, 86 of the hinge housing 60. Thus, as the hinge 38 moves the rear lift gate 22 between the lowered closed position and the raised open position, the pair of housing rollers 78 can sandwich and respectively roll along the pair of outwardly facing arc shaped surfaces 88 of the hinge arm 42, and the pair of arm rollers 56 are sandwiched by and respectively roll along the pair of inwardly facing arc shaped surfaces 90 of the hinge housing 60.

The hinge 38 can include a stop surface 106 between the hinge housing 60 and the hinge arm 42 that is operable to maintain a minimum distance between the pair of arm rollers 56 and the pair of housing rollers 78. For example, the stop surface 106 of the hinge arm 42 can engage against the protrusion defining the opening 94 adjacent the proximal end 80 of the hinge housing 60.

Although specific example embodiments are illustrated and described, it will be apparent to those skilled in the art that such specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A combination truck and truck cap comprising;
a truck including a cargo box with a tailgate, the tailgate having an exterior side including a convex upper margin in the horizontal direction;
a truck cap mounted to the truck over the cargo box, the truck cap including a rear lift gate hingedly coupled to a truck cap body and movable between a lowered closed position and a raised open position, the rear lift gate of the truck cap including a lower margin having a convex shape in the horizontal direction generally corresponding to the convex upper margin of the tailgate, the rear lift gate further including a seal strip mounted to an interior side of the convex lower margin of the rear lift gate overlaying the convex upper margin of the exterior side of the tailgate with the seal strip of the interior side of the convex lower margin of the rear lift gate sealing against the exterior side of the convex upper margin of the tailgate that is overlayed by the convex lower margin of the rear lift gate when the rear lift gate is in the lowered closed position;
wherein a glass sheet extends to form each of the convex lower margin, a pair of opposite side edges, and an upper edge of the rear lift gate.

2. The combination of claim 1, further comprising a second seal strip mounted to the truck cap body and the second seal strip sealing against the interior side of the rear lift gate along an upper edge and opposite side edges of the rear lift gate when the rear lift gate is in the lowered closed position.

3. The combination of claim 1, wherein when the rear lift gate is in the lowered closed position, a central portion of the convex lower margin extends rearward of the side edges.

4. The combination of claim 1, wherein the upper edge is straight and the glass sheet smoothly transitions between the straight upper edge and the convex lower margin.

5. The combination of claim 1, wherein the rear lift gate comprises side edges and has an outwardly contoured shape in a vertical direction intermediate the side edges.

6. The combination of claim 5, wherein the rear lift gate further comprises an upper edge and an outwardly contoured shape in a horizontal direction intermediate the upper edge and the convex lower margin, and wherein the outwardly contoured shapes in the vertical and the horizontal direction cooperate to provide at least a central portion of the rear lift gate having a complex shape.

7. The combination of claim 1, wherein a central portion of the convex lower margin is visible rearward of the truck cap body in side elevation view when the rear lift gate is in the lowered closed position.

8. The combination of claim 1, wherein the truck cap body includes a pair of opposite upright side walls with an upright forward wall extending between the side walls and a roof extending therebetween.

9. A truck cap for covering a cargo box of a truck, the truck comprising a tailgate including an exterior side having a convex upper margin in the horizontal direction, the truck cap comprising:
a truck cap body mountable to the cargo box;
a rear lift gate hingedly coupled to the truck cap body and movable between a lowered closed position and a raised open position, the rear lift gate of the truck cap including a lower margin having a convex shape in the horizontal direction generally corresponding to the convex upper margin of the tailgate, the convex lower margin of the rear lift gate being positionable outboard of and overlaying the convex upper margin of the tailgate when the rear lift gate is in the lowered closed position; and
a seal strip mounted to an interior side of the convex lower margin of the rear lift gate overlaying the convex upper margin and sealable against the convex upper margin of the exterior side of the tailgate that is overlayed by the convex lower margin of the rear lift gate when the rear lift gate is in the lowered closed position:
wherein a glass sheet extends to form each of the convex lower margin, a pair of opposite side edges, and an upper edge of the rear lift gate.

10. The truck cap of claim 9, further comprising a second seal strip mounted to the truck cap body and the second seal strip sealing against the interior side of the rear lift gate along an upper edge and opposite side edges of the rear lift gate when the rear lift gate is in the lowered closed position.

11. The truck cap of claim 9, wherein when the rear lift gate is in the lowered closed position, a central portion of the convex lower margin extends rearward of the side edges.

12. The truck cap of claim 9, wherein the upper edge is straight and the glass sheet smoothly transitions between the straight upper edge and the convex lower margin.

13. The truck cap of claim 9, wherein the rear lift gate comprises side edges and has an outwardly contoured shape in a vertical direction intermediate the side edges.

14. The truck cap of claim 9, wherein the rear lift gate further comprises an upper edge and an outwardly contoured shape in a horizontal direction intermediate the upper edge and the convex lower margin, and wherein the outwardly contoured shapes in the vertical and the horizontal direction cooperate to provide at least a central portion of the rear lift gate having a complex shape.

15. The truck cap of claim 9, wherein a central portion of the convex lower margin is visible rearward of the truck cap body in side elevation view when the rear lift gate is in the lowered closed position.

16. The truck cap of claim 9, wherein the truck cap body includes a pair of opposite upright side walls with an upright forward wall extending between the side walls and a roof extending therebetween.

17. A truck cap for covering a cargo box of a truck, the truck cap comprising:
a truck cap body mountable to the cargo box;
a rear lift gate;
a hinge coupling the rear lift gate to the truck cap body and operating to move the rear lift gate between a lowered closed position and a raised open position, the hinge comprising:
a hinge housing mounted to a first of the rear lift gate and the truck cap body, the hinge housing including at least one arc shaped housing surface;
a hinge arm movably supported by the hinge housing and mounted to a second of the rear lift gate and the truck cap body, the hinge arm including at least one arc shaped arm surface;
a plurality of rollers positioned between the arc shaped housing and arm surfaces to guide the hinge arm along a corresponding arc shaped path as the hinge moves the rear lift gate between the lowered closed position and the raised open position.

18. The truck cap of claim 17, wherein the at least one arc shaped housing surface comprises a pair of inwardly facing arc shaped surfaces opposing each other, and wherein the at least one arc shaped arm surface comprises a pair of outwardly facing arc shaped surfaces opposite each other, and wherein the plurality of rollers comprises a pair of housing rollers positioned adjacent a proximal end of the hinge housing and a pair of arm rollers positioned adjacent a distal end of the hinge arm.

19. The truck cap of claim 18, wherein as the hinge moves the rear lift gate between the lowered closed position and the raised open position, the pair of housing rollers sandwich and respectively roll along the pair of outwardly facing arc shaped surfaces of the hinge arm, and the pair of arm rollers are sandwiched by and respectively roll along the pair of inwardly facing arc shaped surfaces of the hinge housing.

20. The truck cap of claim 18, wherein the hinge further comprises a stop surface between the hinge housing and the hinge arm and operable to maintain a minimum distance between the pair of arm rollers and the pair of housing rollers.

21. The truck cap of claim 17, wherein the hinge housing is coupled to the truck cap body and the hinge arm is coupled to the rear lift gate.

22. The truck cap of claim 17, wherein the hinge comprises a pair of hinges and each hinge pivots the rear lift gate about a pivot point that is aligned with an upper edge of the rear lift gate.

23. The truck cap of claim 17, wherein the hinge arm further comprises an arm coupling flange adjacent a proximal end of the hinge arm and through which the hinge housing is coupled to the rear lift gate.

24. The truck cap of claim 17, wherein the hinge housing further comprises a pair of housing coupling flanges adjacent the proximal end of the hinge housing and through which the hinge housing is coupled to the truck cap body.

25. The truck cap of claim 24, wherein the hinge housing further comprises a manually adjustable positioning member extending adjacent the distal end of the hinge housing that is adjustable to engage against the truck cap body.

26. The truck cap of claim 17, wherein the hinge housing further comprises a central housing including the inwardly facing arc shaped surfaces and a pair of side caps enclosing opposite sides of the central housing.

\* \* \* \* \*

UNITED STATES PATENT AND TRADEMARK OFFICE
CERTIFICATE OF CORRECTION

PATENT NO. : 10,252,603 B2
APPLICATION NO. : 15/471276
DATED : April 9, 2019
INVENTOR(S) : Andrew N. Rohr

Page 1 of 1

It is certified that error appears in the above-identified patent and that said Letters Patent is hereby corrected as shown below:

In the Claims

Column 7, Line 50, In Claim 9, delete "position:" and insert --position;-- therefor Signed and Sealed this
Sixteenth Day of July, 2019

Andrei Iancu
*Director of the United States Patent and Trademark Office*